(12) United States Patent
Jiles et al.

(10) Patent No.: US 7,326,360 B1
(45) Date of Patent: Feb. 5, 2008

(54) COBALT FERRITE BASED MAGNETOSTRICTIVE MATERIALS FOR MAGNETIC STRESS SENSOR AND ACTUATOR APPLICATIONS

(75) Inventors: David C. Jiles, Ames, IA (US); Jason A. Paulsen, St. Paul, MN (US); John E. Snyder, Ames, IA (US); Chester C. H. Lo, Ames, IA (US); Andrew P. Ring, Ames, IA (US); Keith A. Bormann, State Center, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 320 days.

(21) Appl. No.: 10/527,660

(22) PCT Filed: Jul. 23, 2004

(86) PCT No.: PCT/US2004/023886

§ 371 (c)(1),
(2), (4) Date: Mar. 11, 2005

(87) PCT Pub. No.: WO2005/081667

PCT Pub. Date: Sep. 9, 2005

Related U.S. Application Data (60) Provisional application No. 60/489,697, filed on Jul. 24, 2003.

(51) Int. Cl.
*C01G 49/00* (2006.01)
*C01G 51/00* (2006.01)
*C04B 35/32* (2006.01)
*C04B 35/34* (2006.01)

(52) U.S. Cl. ............... 252/62.6; 252/62.62; 252/62.56; 252/62.58; 252/62.55; 252/62.51 R; 264/611; 264/612; 423/594.1; 423/594.5; 75/234; 75/233; 75/447; 75/246; 501/126

(58) Field of Classification Search ............... 252/62.6, 252/62.62, 62.56, 62.51 C, 62.58, 62.55; 264/611, 612; 75/234, 233, 447, 246; 423/594.1, 423/594.5
See application file for complete search history.

(56) References Cited

U.S. PATENT DOCUMENTS 2,882,236 A * 4/1959 Gorter et al. ............ 252/62.56

(Continued)

FOREIGN PATENT DOCUMENTS

| JP | 60-124901 | 7/1985 |
|----|-----------|--------|
| JP | 10-340807 | 12/1998 |

OTHER PUBLICATIONS

M. Fayek, M. Elnimr, S. Ata-Allah, and F.M. SayedAhmed; On the Low-Frequency Conductivity in Manganese Cobalt Ferrites; phys. stat. sol. (a) 143, 379 (1994); 6 pages.

(Continued)

*Primary Examiner*—C. Melissa Koslow
(74) *Attorney, Agent, or Firm*—Reinhart Boerner Van Deuren P.C.

(57) ABSTRACT

Magnetostrictive material based on cobalt ferrite is described. The cobalt ferrite is substituted with transition metals (such manganese (Mn), chromium (Cr), zinc (Zn) and copper (Cu) or mixtures thereof) by substituting the transition metals for iron or cobalt to form substituted cobalt ferrite that provides mechanical properties that make the substituted cobalt ferrite material effective for use as sensors and actuators. The substitution of transition metals lowers the Curie temperature of the material (as compared to cobalt ferrite) while maintaining a suitable magnetostriction for stress sensing applications.

13 Claims, 11 Drawing Sheets

U.S. PATENT DOCUMENTS

| | | |
|---|---|---|
| 6,093,337 A | 7/2000 | McCallum et al. |
| 6,352,649 B1 | 3/2002 | McCallum et al. |

OTHER PUBLICATIONS

Y. Suzuki, G. Hu, R.B. van Dover, R. J. Cava; Magnetic anisotropy of epitaxial cobalt ferrite thin films; Journal of Magnetism and Magnetic Materials 191 (1999) pp. 1-8.

M.H. Mendonca, M.I. Godinho, M.A. Catarino, M.I. da Silva Pereira, F.M. Costa; Preparation and characterisation of spinel oxide ferrite suitable for oxygen evolution anodes; Solid State Sciences 4 (2002) pp. 175-182.

M.K. Fayek, F.M. Sayed Ahmed, S.S. Ata-Allah, M.K. Elnimer, M.F. Mostafa; Untitled; Paper on Mössbauer effect and electrical conductivity of $CoMn_xFe_{2-x}O_4$ ($0 \leq x \leq 1$); © 1992 Chapman & Hall; 6 pages.

A. R. Chetal, P. Mahto and P. R. Sarode; Chemical-Shift Of The X-Ray K-Absorption Edge Of Co In Some Compounds, Complexes and Minerals; J. Phys. Chem. Solids vol. 49, No. 3. pp. 279-283; 1998.

Yangkye Ahn, Eun Jung Choi, Sehun Kim, Hang Nam Ok; Magnetization and Mössbauer study of cobalt ferrite particles from nanophase cobalt iron carbonate; Aug. 2001; Materials Letters 50 (2001) pp. 47-52.

T.A.S. Ferreira, J.C. Waerenborgh, M.H.R.M. Mendonca, M.R. Nunes, F.M. Costa; Structural and morphological characterization of $FeCo_2O_4$ and $CoFe_2O_4$ spinels prepared by a coprecipitation method; Solid State Sciences 5 (2003) pp. 383-392.

Biao Zhou, Ya-Wen Zhang, Chun-Sheng Liao, Chun-Hua Yan; Magnetism and phase transition for $CoFe_{2-x}Mn_xO_4$ nanocrystalline thin films and powders; Journal of Magnetism and Magnetic Materials 247 (2002) pp. 70-76.

Biao Zhou, Ya-Wen Zhang, Chun-Sheng Liao, Fu-Xiang Cheng, and Chun-Hua Yan, Liang-Yao Chen and Song-You Wang; Enhanced magneto-optical Kerr effects and decreased Curie temperature in Co-Mn ferrite thin films; Applied Physics Letters, vol. 79, No. 12; Sep. 17, 2001; pp. 1849-1851.

Dong Hoon Lee, Hong Seok Kim, Chul Hyun Yo, Kyungsoo Ahn, Kue Hong Kim; The magnetic properties and electrical conduction mechanism of $Co_{1-x}Mn_xFe_2O_4$ spinel; Materials Chemistry and Physics 57 (1998) pp. 169-172.

ScienceDirect—Solid State Sciences; Preparation and characterisation of spinel oxide ferrites suitable for oxygen evolution anodes; Solid State Sciences vol. 4, Issue 2, Feb. 2002; pp. 175-182.

* cited by examiner

COBALT FERRITE BASED MAGNETOSTRICTIVE MATERIALS FOR MAGNETIC STRESS SENSOR AND ACTUATOR APPLICATIONS

CROSS-REFERENCE TO RELATED PATENT APPLICATIONS

This patent application claims the benefit of U.S. Provisional Patent Application No. 60/489,697, filed Jul. 24, 2003.

STATEMENT REGARDING FEDERALLY SPONSORED RESEARCH AND DEVELOPMENT

This invention was made in part with U.S. Government support under Grant Number NAG-1-02098 awarded by the National Aeronautical and Space Administration (NASA). The U.S. Government may have certain rights in this invention.

FIELD OF THE INVENTION

This invention pertains to magnetostrictive composites which are effective for use as magnetostrictive sensors and actuators. More particularly, the magnetostrictive composites include metal oxide of the ferrite type and a metallic and/or organic binder. The metal oxide ferrite contains additional chemical elements that are used to control its properties including magnetostriction and Curie temperature. The metal oxide of the ferrite type and metallic and/or organic binder provides magnetostrictive and mechanical properties that make the composites effective for use in a wide variety of applications.

BACKGROUND OF THE INVENTION

The magnetic properties of many ferromagnetic materials undergo changes with stress. For example, the magnetic permeability of nickel-iron alloys and iron-cobalt alloys increases and that of nickel decreases with tensile stress. Applied stress can also change the direction of magnetization in magnetic materials. Conversely, if these metals are subject to magnetic fields, their dimensions can change. These magnetostrictive effects, including the Joule effect (change in length when a ferromagnetic rod is placed in a longitudinal field), the Villari effect (change in magnetization when a magnetized ferromagnetic rod is subjected to longitudinal stress), the Matteucci effect (change in magnetization when a ferromagnetic material is subjected to a torque), and the Wiedemann effect (torque on a ferromagnetic cylinder when subjected to a helical magnetic field) can be used for a variety of applications. Examples of the use of ferromagnetic materials include sensors, transducers, and vibrators.

Magnetoelastic stress sensors operate on the principle that magnetic properties of materials are altered by stress via the magnetoelastic coupling. These magnetic property changes can be detected remotely, for example, by measuring magnetic field near the sensor surface using a Hall effect device. Magnetoelastic materials therefore offer realistic prospects for development of contactless sensors for use in stress and torque applications. Magnetostrictive cobalt ferrite composites hold promise for use in advanced magnetomechanical stress and torque sensors because of their high level of magnetostriction, high rate of change of magnetostriction with applied magnetic field (i.e. $d\lambda/dH$) and high rate of change of magnetization with applied stress (i.e. $dM/d\sigma$).

Most stress sensor applications ideally require materials which exhibit large reversible changes in magnetization with applied stress together with minimal magnetomechanical hysteresis. As described in U.S. Pat. Nos. 6,093,337 and 6,352,649, hereby incorporated by reference, metal bonded cobalt ferrite composites have been shown to be excellent candidates for stress sensors due to a large magnetomechanical effect and high sensitivity to stress. The composites show linear magnetostrictive strains of magnitude up to $225 \times 10^{-6}$ with a rate of change of magnetostriction with applied field $(d\lambda/dH)_{max}$ of $1.3 \times 10^{-9}$ $A^{-1}m$ under no external load. They also show good mechanical properties, excellent corrosion resistance, and can be made at low cost.

A drawback to metal-bonded cobalt ferrite composite materials is that the materials exhibit some magnetomechanical hysteresis at room temperature. For these materials to be suitable for sensor applications, the hysteresis must be reduced.

The invention provides such a reduction in hysteresis. These and other advantages of the invention, as well as additional inventive features, will be apparent from the description of the invention provided herein.

BRIEF SUMMARY OF THE INVENTION

The invention provides a transition metal-substituted cobalt ferrite magnetostrictive material that provides a reduction in hysteresis. The cobalt ferrite is doped with manganese (Mn) (or aluminum Al or transition elements such as chromium Cr, zinc Zn, or copper Cu or mixtures thereof) by substituting Mn (or Cr, Zn, Al, or Cu or mixtures thereof) for iron or cobalt to form manganese-substituted cobalt ferrite (or other transition metal-substituted cobalt ferrite) that provides mechanical properties that make the substituted cobalt ferrite material effective for use as sensors and actuators. The Mn (or Cr, Zn, Al, or Cu or mixtures thereof) lowers the Curie temperature of the material while maintaining a suitable magnetostriction for stress sensing applications In the case of manganese substitution, substituted cobalt ferrite is made by mixing oxides or carbonates of Fe, Mn, and Co in the targeted proportions. For example, $Fe_2O_3$, $MnO_2$, and $Co_3O_4$ powders may be used. The powder is pressed and calcined at a temperature within the range of about 900° C. to about 1200° C. for a period of time in the range of about 2 hours to about 24 hours in air, ball milled to less than (<) 38 micron powder, pressed and calcined again at a temperature within the range of about 900° C. to about 1200° C. for a period of time in the range of about 2 hours to about 24 hours in air. The powder is then re-milled to less than 38-micron powder, mixed, pressed into the desired shape and sintered at a temperature in the range of about 1000° C. to about 1350° C. for a period of time in the range of about 2 hours to about 24 hours in air. The sintered material is then cooled down either inside furnace at a controlled cooling rate in the range of about 4° C. per hour to about 850° C. per hour, or by removal from furnace to room temperature air. The manganese substituted cobalt ferrite has the general formulae of $CoFe_{2-x}Mn_xO_4$ where x is 0 to 1.0 and $Co_{1-y}Mn_yFe_2O_4$ where y is 0 to 0.95. The materials are useful for stress sensor and actuator applications.

Metal and/or organic binders may be added to the powders to create desired material properties. The addition of the binders changes the mechanical properties, braze-ability, and sensitivity of the material.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION $CoFe_2O_4$ (cobalt ferrite) has been shown to have a large magnetostriction which indicates a large magnetomechanical effect for stress sensing and actuating. A disadvantage of the $CoFe_2O_4$ material is that it exhibits unacceptably high levels of magnetomechanical hysteresis, which only becomes negligibly small at temperatures above 60° C. This limits the sensor applications of such a material because linear operation is highly desirable. We have developed a material for use in magnetostrictive stress sensor and actuator applications.

Figure 1:
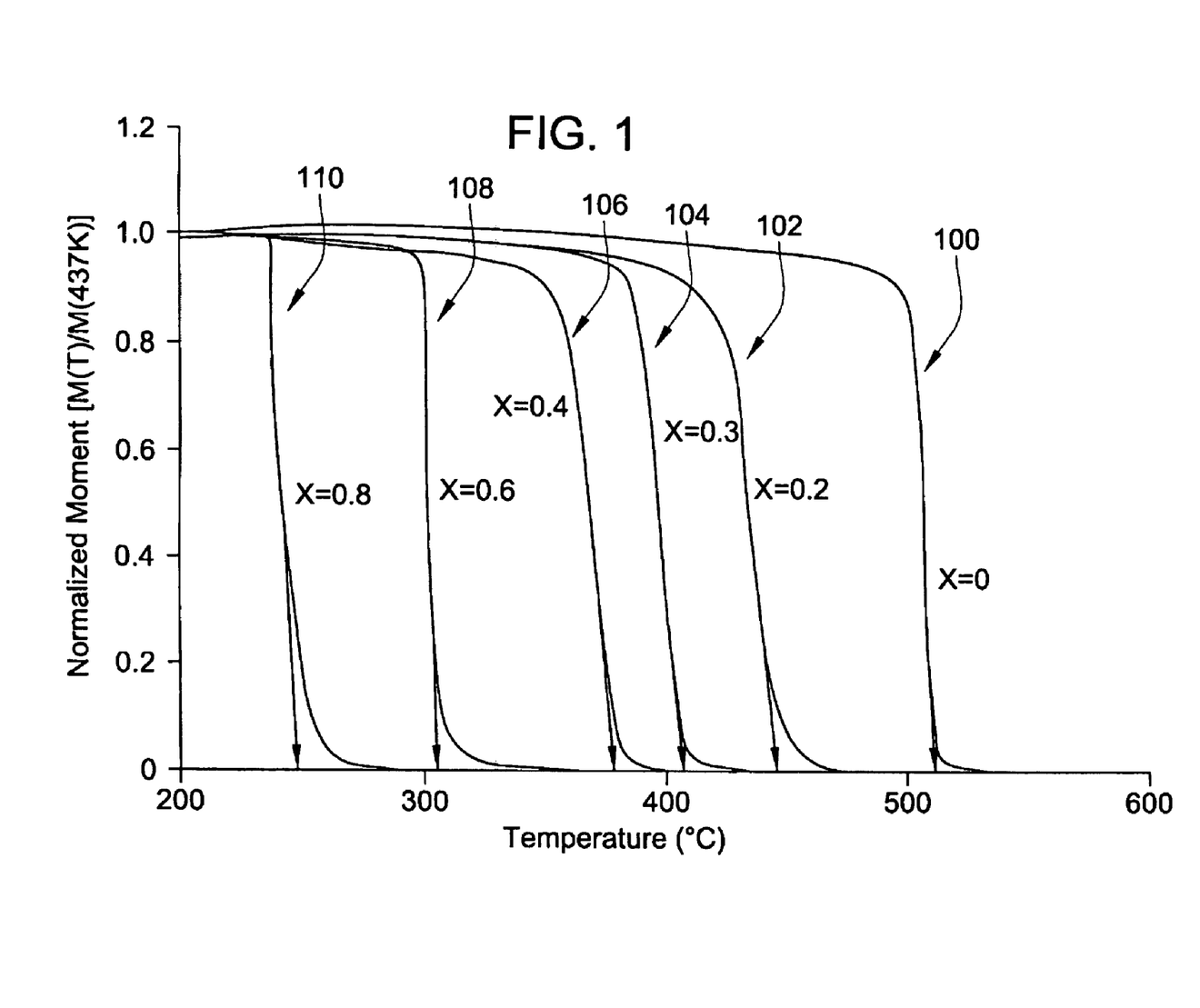
FIG. 1 is a graph illustrating normalized magnetic moment (measured with applied field of 7.96 kA/m [100 Oe]) versus temperature upon cooling for pure cobalt ferrite and different manganese contents of manganese-substituted cobalt ferrite samples.

Turning now to FIG. 1, substituting manganese for iron or cobalt in cobalt ferrite material reduces the Curie temperature of the material by up to 300° C. The substitution maintains a suitable magnetostriction (see FIG. 3), which will in turn allow the material to be used as a stress sensor or actuator over a wider range of operational temperatures. We have developed materials $CoFe_{2-x}Mn_xO_4$ where x is 0 to 1 and $Co_{1-y}Mn_yFe_2O_4$ where y is 0 to 0.95 for use as a stress sensor or actuator.

Figure 2:
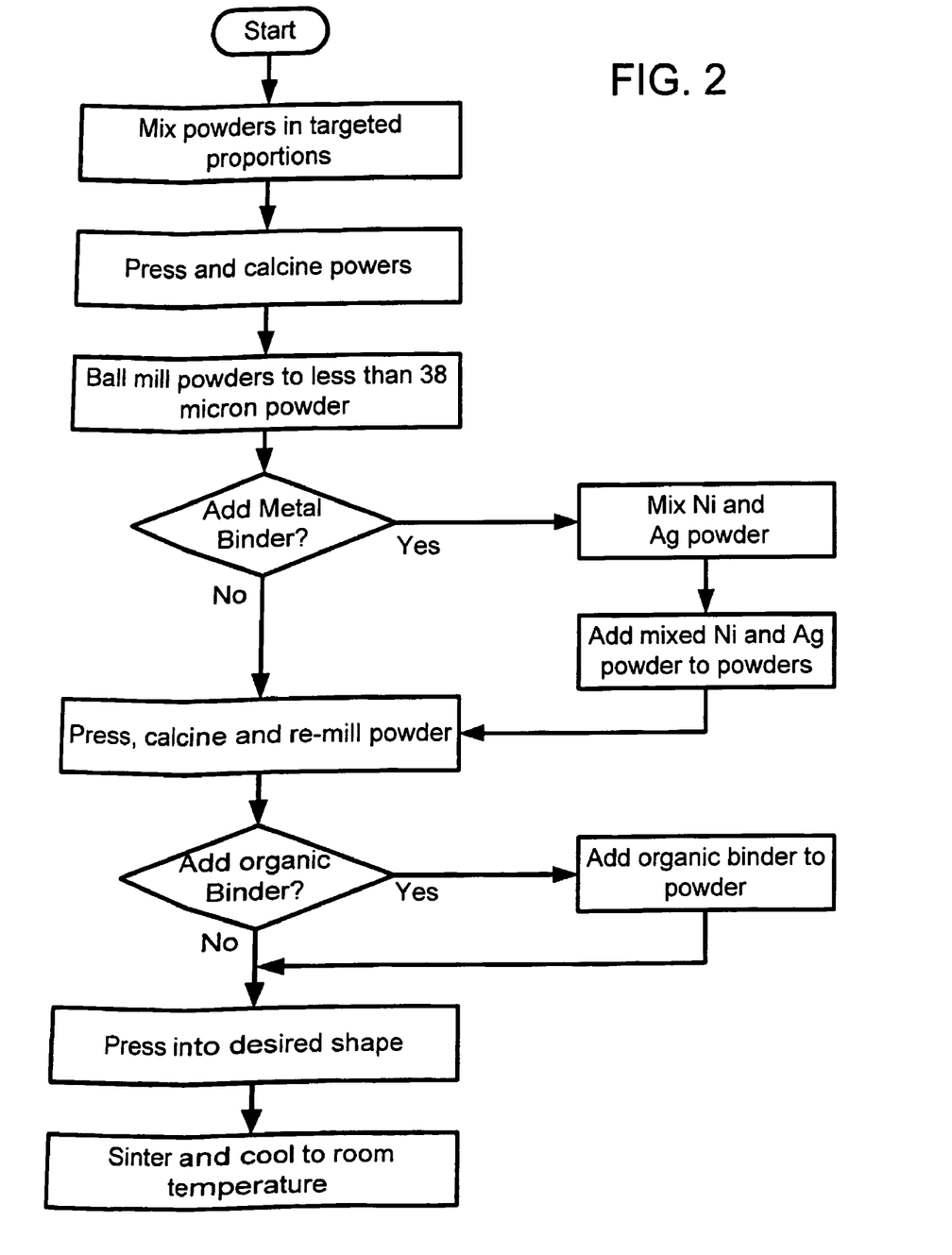
FIG. 2 is a flowchart illustrating the steps to make manganese substituted cobalt ferrite in accordance with the teachings of the invention.

Turning now to FIG. 2, the manganese substituted cobalt ferrite samples were made in one embodiment by mixing oxides or carbonates of Fe, Mn, and Co in the targeted proportions. In one embodiment, $Fe_2O_3$, $MnO_2$, and $Co_3O_4$ powders are used. The materials were fabricated in the following way: The process involves mixing $Fe_2O_3$, $MnO_2$, and $Co_3O_4$ powders in the targeted proportions. The powder is calcined, ball-milled, mixed, and calcined again. The powder is then re-milled, mixed, pressed into slugs and sintered in air. The microstructure of the samples was characterized using a scanning electron microscope (SEM). Energy-dispersive x-ray spectroscopy (EDX) was used to determine the final composition of the samples. This fabrication procedure was refined until it produced uniform microstructures and chemically homogeneous samples. In one embodiment, the powder is pressed and calcined at about 1000° C. for about 24 hours in air, ball milled to less than (<) 38 micron powder, pressed and calcined again at about 1000° C. for about 24 hours in air. The powder is then re-milled to less than 38-micron powder, mixed, pressed into cylindrical slugs or other desired shapes and sintered at about 1350° C. for about 24 hours in air. The samples are cooled by removal from the furnace to room temperature air.

In the description that follows, samples manufactured by the process described above shall be used to describe the materials. The composition of the samples are shown in Table 1, which shows target and final compositions for a series of manganese-substituted cobalt ferrite samples with various amounts of manganese.

TABLE 1

| Target Composition | Composition by EDX | | |
|---|---|---|---|
| | Co | Fe | Mn |
| $CoFe_{1.8}Mn_{0.2}O_4$ | 0.95 | 1.83 | 0.22 |
| $CoFe_{1.7}Mn_{0.3}O_4$ | 0.98 | 1.73 | 0.29 |
| $CoFe_{1.6}Mn_{0.4}O_4$ | 0.95 | 1.62 | 0.44 |
| $CoFe_{1.4}Mn_{0.6}O_4$ | 0.93 | 1.43 | 0.65 |
| $CoFe_{1.2}Mn_{0.8}O_4$ | 0.96 | 1.2 | 0.84 |

To determine Curie temperatures, the magnetic moment was measured as a function of temperature using a vibrating sample magnetometer (VSM) with a high temperature furnace and temperature controller, under computer control. The magnetic moment measurements were performed over a temperature range of 100° C. to 650° C. The samples were heated through the Curie temperature transition at a rate of 2° C. per minute, and then cooled back through the transition at the same rate. These measurements were performed under an applied field of 7.96 $KAm^{-1}$ (100 Oe). Curie temperatures of the samples were determined from the cooling curves by linearly extrapolating the magnetic moment versus temperature curve from the region of maximum slope down to the temperature axis. Saturation magnetization of the samples was measured using the VSM under an applied field of 560 $KAm^{-1}$ (7 KOe).

The temperature dependence of the normalized magnetic moment of the pure cobalt ferrite and the material with various amounts of manganese substituted for Fe ($CoFe_{2-x}Mn_xO_4$) is shown in FIG. 1. Curve 100 is for pure cobalt ferrite (i.e., x=0), curve 102 is for $CoMn_{0.2}Fe_{1.8}O_4$, curve 104 is for $CoMn_{0.3}Fe_{1.7}O_4$, curve 106 is for $CoMn_{0.4}Fe_{1.6}O_4$, curve 108 is for $CoMn_{0.6}Fe_{1.4}O_4$, and curve 110 is for $CoMn_{0.8}Fe_{1.2}O_4$. All of the samples exhibited a sharp increase in magnetic moment on cooling through the Curie temperature. It is evident that substituting Manganese for Fe in cobalt ferrite reduced the Curie temperature, by as much as 300° C. in the case of $CoFe_{1.2}Mn_{0.8}O_4$.

Figure 3:
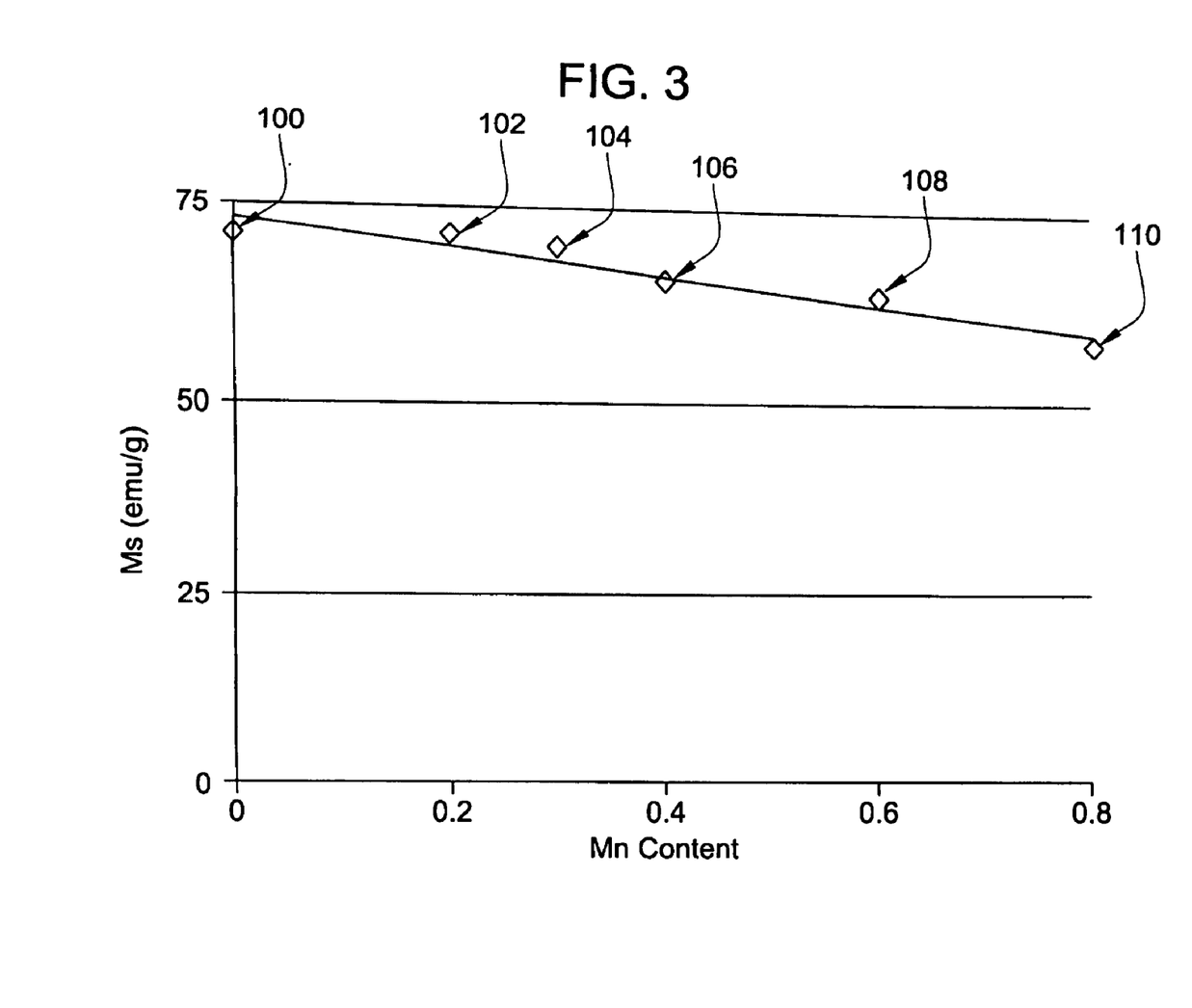
FIG. 3 is a graph illustrating saturation magnetization of manganese-substituted cobalt ferrite $CoFe_{2-x}Mn_xO_4$ with various manganese contents at room temperature.

FIG. 3 shows the saturation magnetization of pure cobalt ferrite along with the Manganese substituted ferrite samples at room temperature. The reference numerals correspond to FIG. 1. Although Manganese substitution made a substantial decrease in Cure temperature, it can be seen that saturation magnetization showed only a modest decline with a maximum decline of 20% over the range of $0 \leq x \leq 0.8$ for the $CoMn_xFe_{2-x}O_4$ material.

Figure 4:
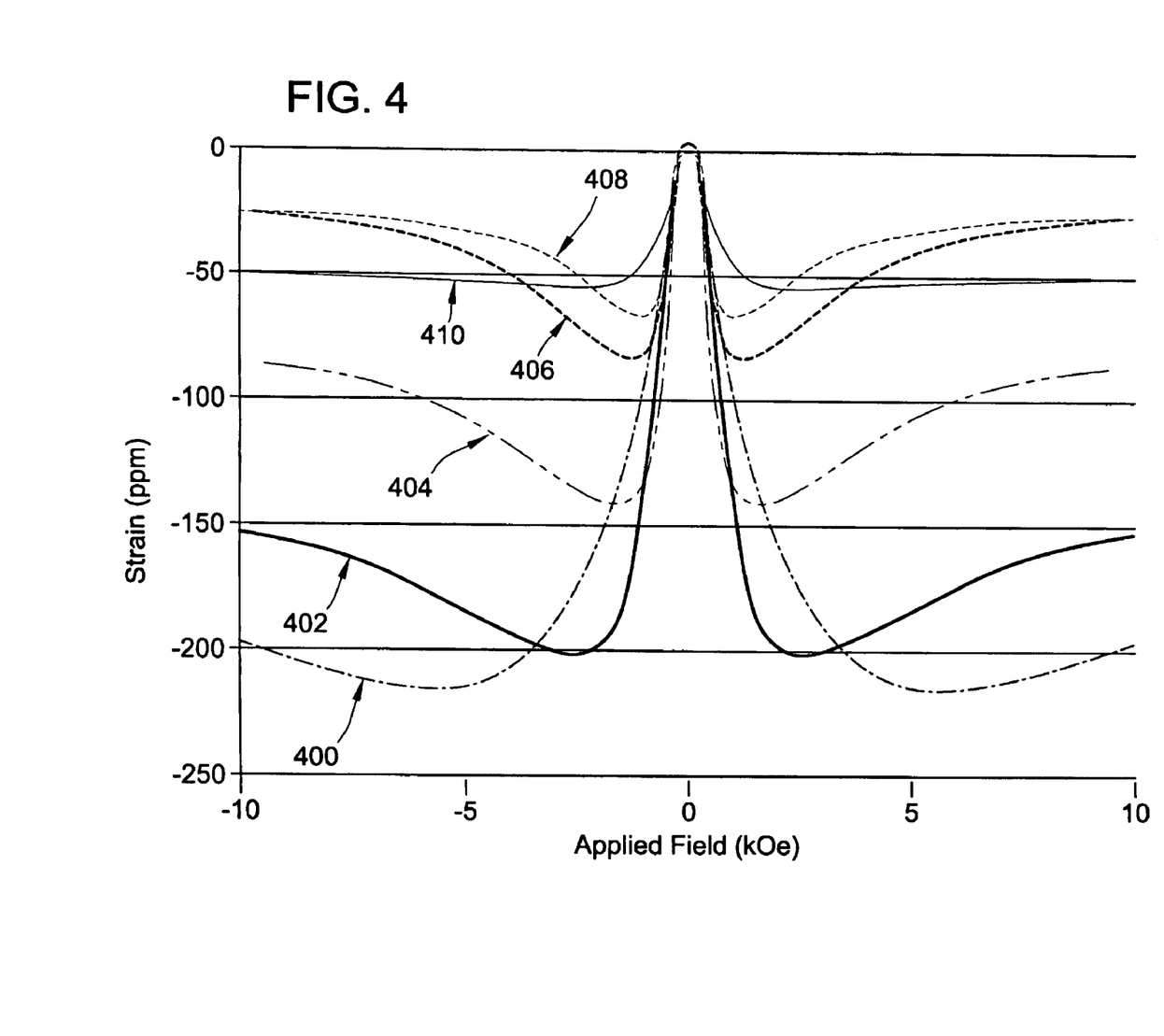
FIG. 4 is a graph illustrating magnetostriction curves for manganese-substituted cobalt ferrite samples.
Figure 5:
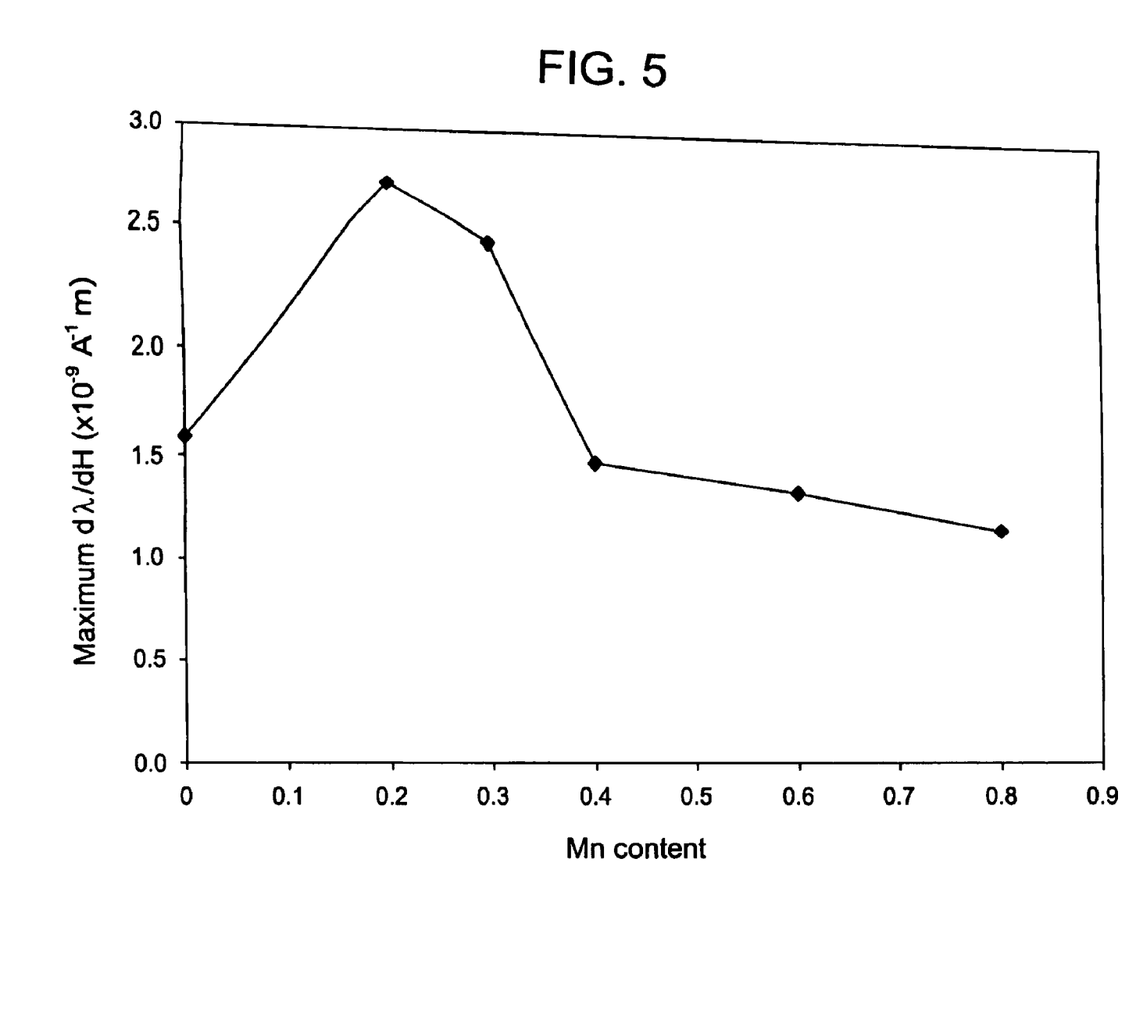
FIG. 5 is a graph illustrating the maximum derivative of magnetostriction with respective to applied field (i.e. $d\lambda/dH$) as a function of manganese content of manganese substituted cobalt ferrite.

Turning now to FIG. 4, it can be seen that samples with low manganese contents (e.g. $CoFe_{1.8}Mn_{0.2}O_4$) have saturation magnetostriction comparable with that of pure cobalt ferrite. Curve 400 is for pure cobalt ferrite (i.e., x=0), curve 402 is for $CoMn_{0.2}Fe_{1.8}O_4$, curve 404 is for $CoMn_{0.3}Fe_{1.7}O_4$, curve 406 is for $CoMn_{0.4}Fe_{1.6}O_4$, curve 408 is for $CoMn_{0.6}Fe_{1.4}O_4$, and curve 410 is for $CoMn_{0.8}Fe_{1.2}O_4$. Further increase in manganese content reduces the saturation magnetostriction. It should however be noted that even the lowest saturation magnetostriction (55 ppm for CoFe1.2Mn0.8O4) is higher than that of nickel, which has been considered for magnetomechanical sensors. Furthermore, Mn substitution (for x up to 0.3) increases the slope of the magnetostriction curve $(d\lambda/dH)$ at low field as can be seen in FIG. 5. This slope is related to the stress sensitivity and provides an indication of the potential performance of a magnetomechanical sensor. A larger slope indicates a potentially higher stress sensitivity. The slope was determined to be $2.7 \times 10^{-9}$ $A^{-1}m$ and $2.5 \times 10^{-9} A^{-1}m$ for $CoMn_{0.2}Fe_{1.8}O_4$ and $CoMn_{0.3}Fe_{1.7}O_4$, respectively, which are 72% and 55% larger than the slope $(1.6 \times 10^{-9} A^{-1}m)$ measured from the pure cobalt ferrite sample.

Figure 6:
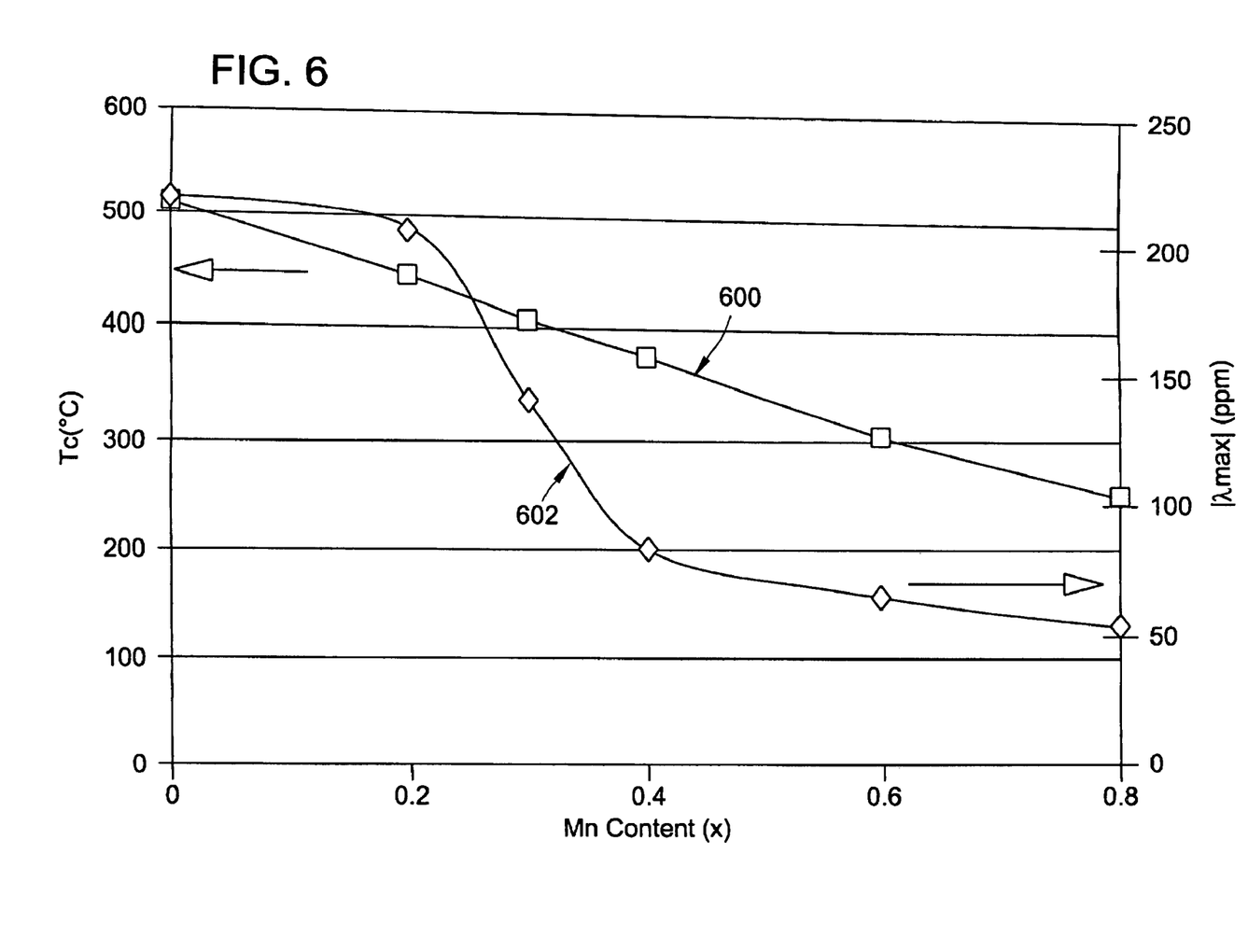
FIG. 6 is a graph illustrating Curie temperature and magnitude of maximum magnetostriction of substituted cobalt ferrite samples as a function of manganese content.

Turning now to FIG. 6, curve 600 represents the Curie temperature of the samples of $CoFe_{2-x}Mn_xO_4$ of FIGS. 1, 3-4 and curve 602 represents the maximum magnetostriction of the samples. It can be seen that the Curie temperature decreases approximately linearly with increasing manganese content. When the Mn content increases, the magnitude of the maximum magnetostriction also decreases as a function of Mn content. It can be seen that the manganese substituted cobalt ferrite has an amplitude of magnetostriction of at least about 50 to about 250 ppm.

Returning to FIG. 2, note that metal binder can also be added to the Mn substituted cobalt ferrite. In one embodiment, the metal binder consists of 3% Ni, 97% Ag by volume. The binder is created by mixing high purity Ni and Ag powder together where the Ag powder comprises a larger volume fraction of the metallic binder and the Ni powder comprise at least volume fraction of the metallic binder. The metal bonded samples consisted of 2% binder and 98% Mn substituted cobalt ferrite by volume. The metal binder is added to the Mn substituted cobalt ferrite powder before the final ball-milling and finish grinding to ensure it is well mixed.

An organic binder may also be used to create a more dense material with less porosity. The binder in one embodiment consists of an acetone based compound, such as an acrylic binder (e.g., 7045M73181:B73181 by Ferro Electronic Materials), that holds the powder together while the powder is being pressed. The organic binder is burned out of the sample during the final sintering so that no binder was left in the material. For example, in one embodiment the binder is mixed with the Mn substituted cobalt ferrite powder after the final grinding and then the organic bound powder is pressed into the desired shape. The material is then placed in a furnace at 500° C. for 5 hours to allow the organic binder to burn out. In one embodiment, the material is heated to about 1350° C. at a rate of 850° C. per hour. The material is left at this temperature for about 24 hours and then cooled down to 500° C. at a rate of 850° C. per hour. The material is then removed to room temperature air to cool.

Figure 7:
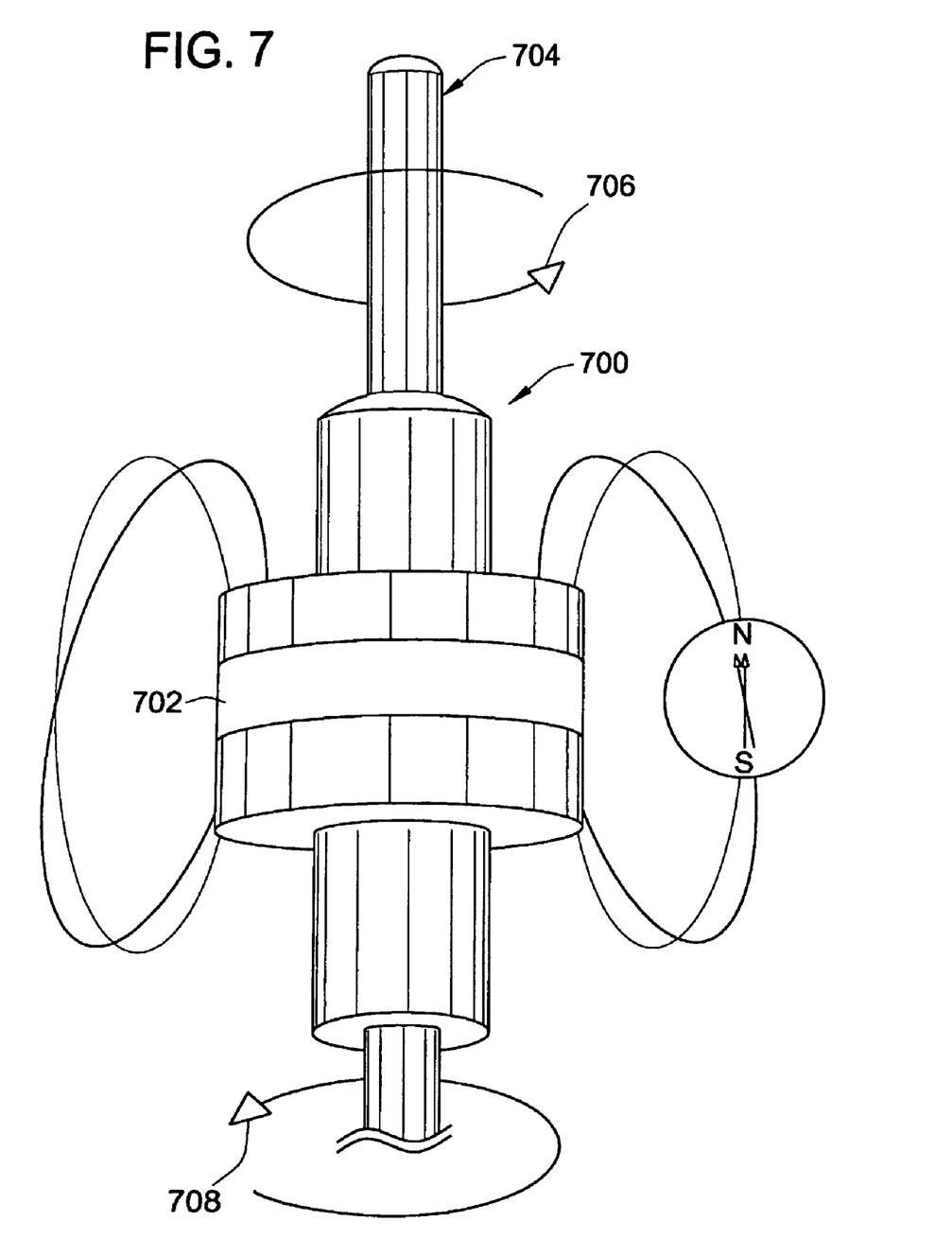
FIG. 7 is an illustration of a torque sensor using substituted cobalt ferrite material in accordance with the teachings of the present invention.
Figure 8:
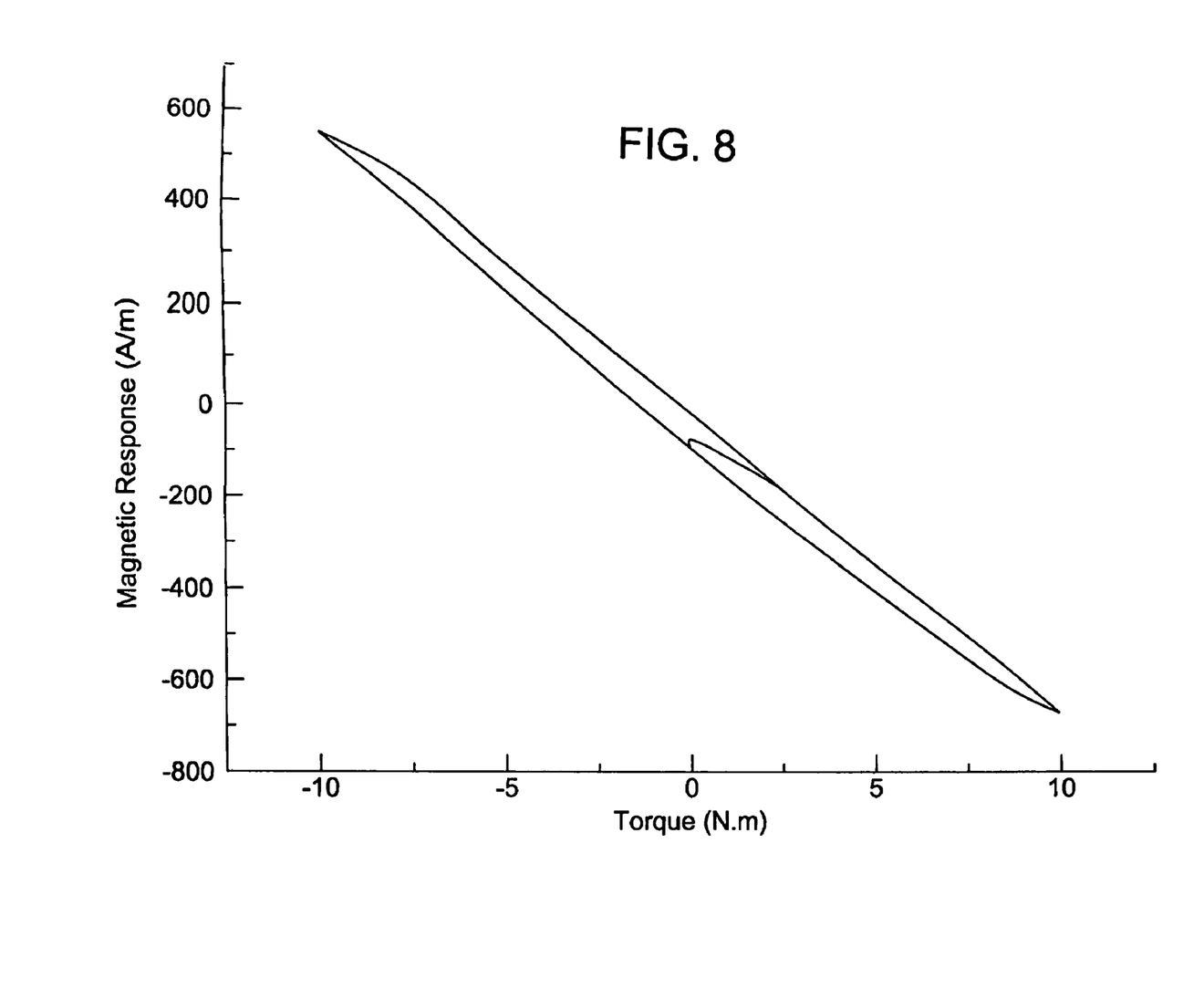
FIG. 8 is a graph illustrating magnetic response versus applied torque of substituted cobalt ferrite material.

Turning now to FIGS. 7-8, one application for manganese-substituted cobalt ferrites is use as a torque sensor 700. The sensor 700 has a band 702 of manganese-substituted cobalt ferrite material. As torque is applied to the shaft 704 as represented by arrows 706, 708, the magnetic response of the band 702 changes. A typical result of the magnetic response is illustrated in FIG. 8. The magnetomechanical response to applied torque has been measured to be as high as 64 $A/Nm^2$ with a small hysteresis of ±0.5 Nm.

Figure 9:
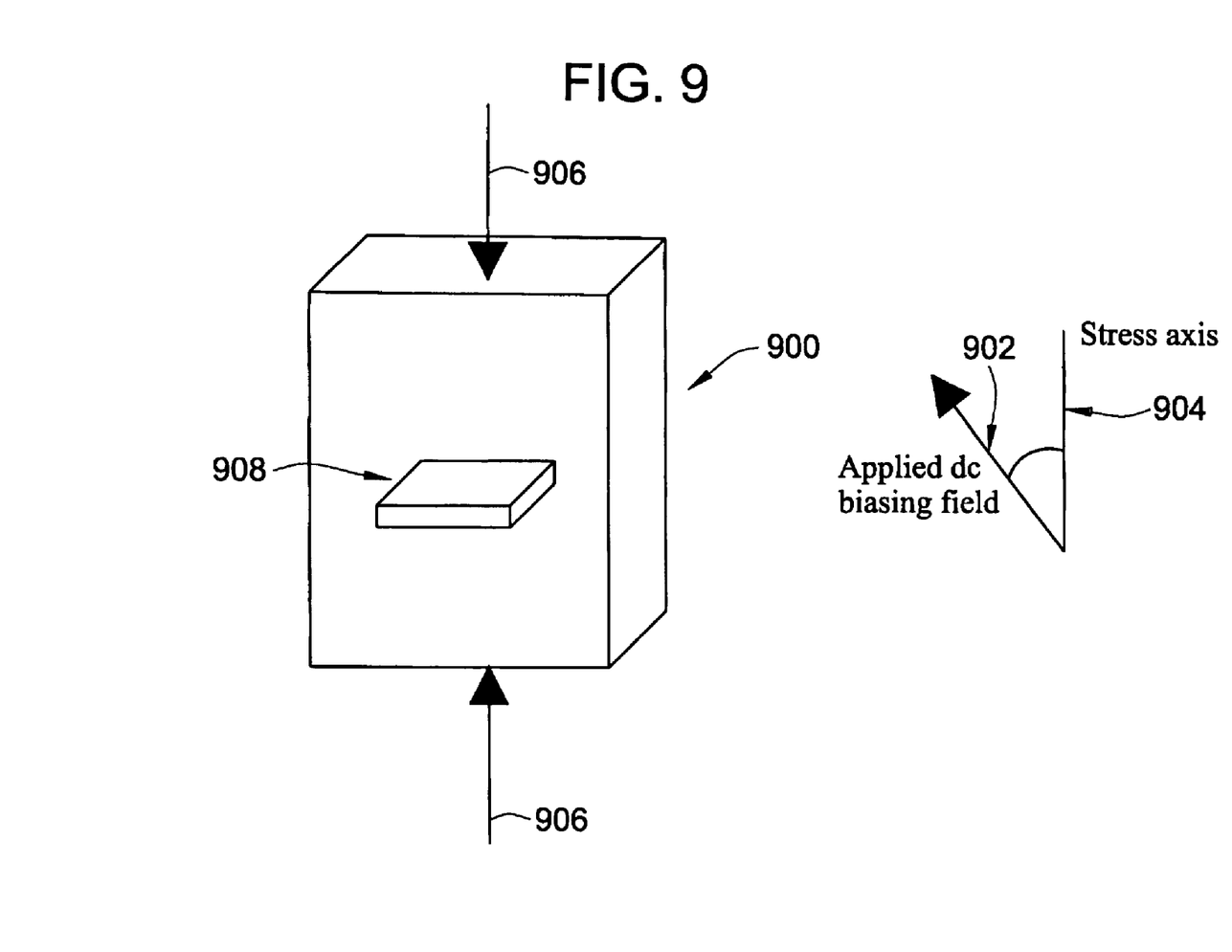
FIG. 9 is an illustration showing the use of manganese-substituted cobalt ferrite as a stress sensor.

Turning now to FIG. 9, another application for manganese-substituted cobalt ferrite is used as a stress sensor 900. A dc biasing field 902 (relative to the stress axis 904) is applied to the manganese-substituted cobalt ferrite sensor 900. Any applied stress (as represented by arrows 906) induces changes in the magnetization due to the magnetomechanical effect. Such changes in magnetization can be measured in a non-contact manner using a Hall Effect sensor 908 and the like to detect changes in the surface field.

Figure 10:
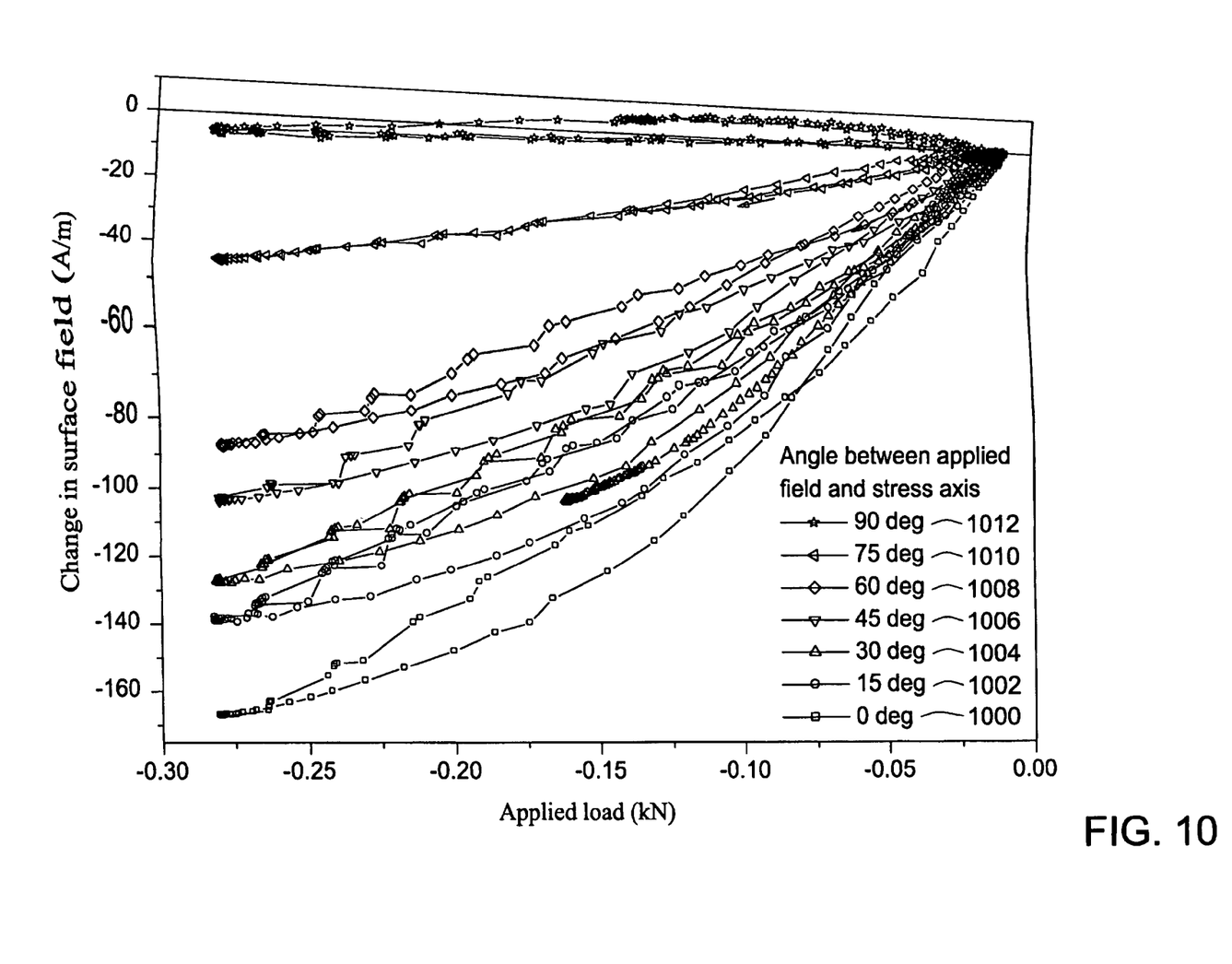
FIG. 10 is a graph illustrating the change in surface magnetic field of pure cobalt ferrite over a stress cycle under a constant biasing field inclined at various angles with respect to the stress axis.
Figure 11:
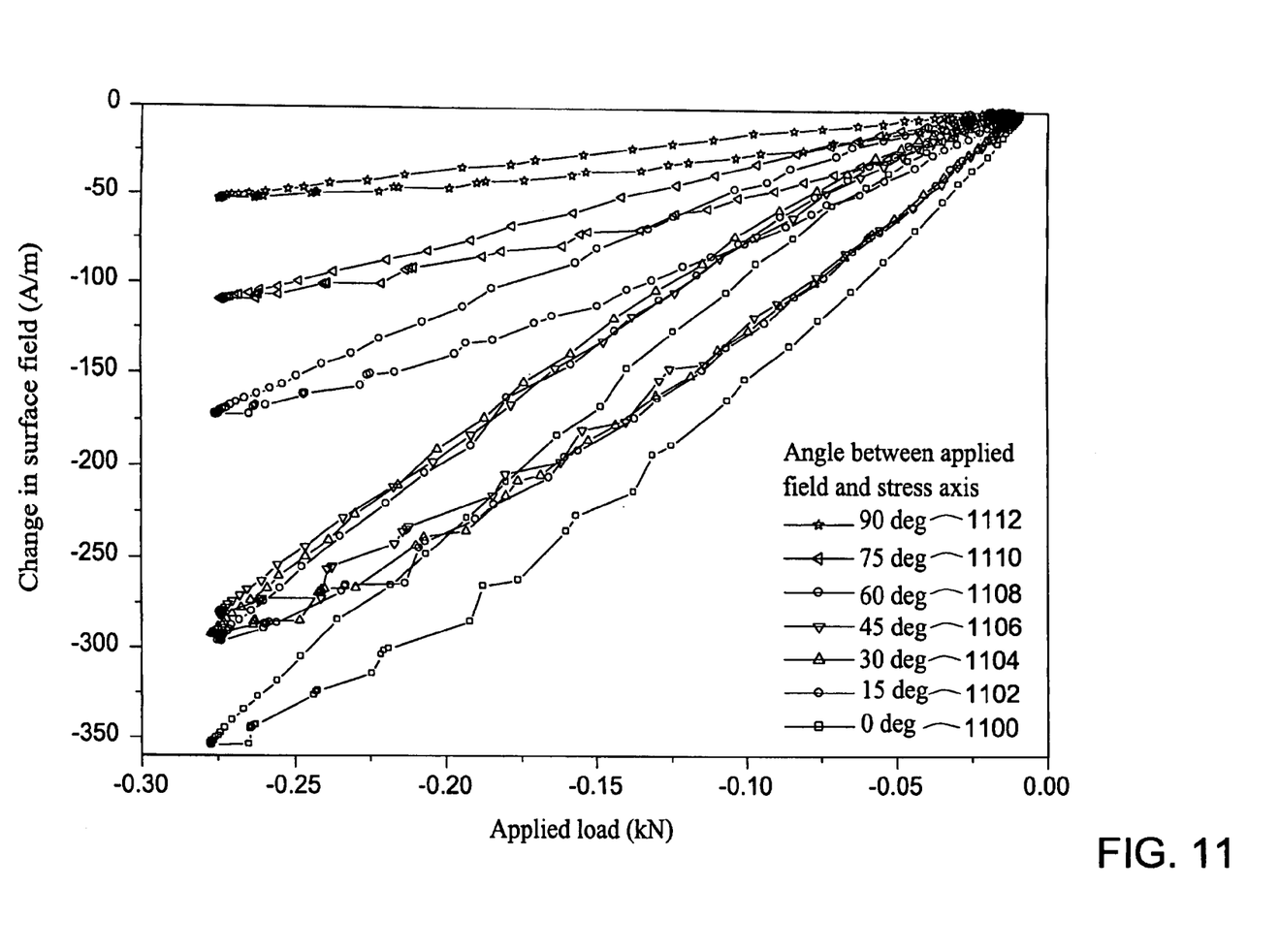
FIG. 11 is a graph illustrating the change in surface magnetic field of a manganese substituted cobalt ferrite $CoMn_{0.3}Fe_{1.7}O_4$ over a stress cycle under a constant biasing field inclined at various angles with respect to the stress axis.

FIG. 10 illustrates changes in surface magnetic field of pure cobalt ferrite (i.e. x=0 in $CoMn_xFe_{2-x}O_4$) over a stress cycle under a constant biasing field of 7.96 kA/m (100 Oe) inclined at various angles with respect to the stress axis. Curves 1000 are for an angle of 0 degrees, curves 1002 are for an angle of 15 degrees, curves 1004 are for an angle of 30 degrees, curves 1006 are for an angle of 45 degrees, curves 1008 are for an angle of 60 degrees, curves 1010 are for an angle of 75 degrees, and curves 1012 are for an angle of 90 degrees. As can be seen, the results indicate that a biasing field applied along the stress axis gives rise to the largest change in surface field (i.e. highest sensitivity). FIG. 11 illustrates changes in surface magnetic field of manganese-substituted cobalt ferrite for $CoMn_{0.3}Fe_{1.7}O_4$ over a stress cycle under a constant biasing field of 7.96 kA/m (100 Oe) inclined at various angles with respect to the stress axis. Curves 1100 are for an angle of 0 degrees, curves 1102 are for an angle of 15 degrees, curves 1104 are for an angle of 30 degrees, curves 1106 are for an angle of 45 degrees, curves 1108 are for an angle of 60 degrees, curves 1110 are for an angle of 75 degrees, and curves 1112 are for an angle of 90 degrees. It can be seen from comparing FIGS. 10 and 11 that the stress sensitivity is higher for the manganese-substituted cobalt ferrite $CoMn_{0.3}Fe_{1.7}O_4$ than for the pure cobalt ferrite $CoFe_{2.0}O_4$.

From the foregoing, it can be seen that manganese-substituted cobalt ferrites offer improved scope for developing magnetomechanical sensors and actuators beyond that possible with the original cobalt ferrite material. Substitution of Mn for Fe has the effect of making a substantial decrease in Curie temperature, which should have a substantial effect on the temperature dependence of magnetic and magnetomechanical properties contributing to magnetomechanical hysteresis. The maximum magnetostriction magnitude, although decreased, is still sizable, and is more than sufficient for use as a magnetomechanical stress sensing material for many applications. The saturation magnetization, upon which the magnitude of the external field used in non-contact sensing will depend, shows only a modest decrease throughout the compositional range. Similarly, the slope of the magnetostriction curve at low field, upon which the sensitivity for stress sensing applications will depend, is higher for manganese-substituted cobalt ferrites $CoFe_{2-x}Mn_xO_4$ with manganese content up to x=0.3. As a result, it should be possible to adjust the temperature dependence of magnetomechanical hysteresis while still maintaining sufficient magnetomechanical sensor material performance. The substituted cobalt ferrite material may be created without using any binder, with either the metal or organic binders, or with both of the metal and organic binders. The approach to use depends on the desired material properties. Metal-substituted cobalt ferrite using Mn, Cr, Zn, Al, or Cu or mixtures thereof, could also give the desired material properties.

The effects of composition on the magnetic and magnetomechanical properties of cobalt ferrite substituted with manganese have been described. The Curie temperature of cobalt ferrite can be reduced over a substantial range by the substitution of Manganese for Ferrite. The fact that the Curie temperature and magnetostriction of manganese-substituted cobalt ferrite are selectable by adjusting manganese content allows the material properties to be optimized for use as stress sensors over a range of operational temperatures. Metal-substituted cobalt ferrite using Mn, Cr, Zn, Al, or Cu or mixtures thereof, with or without Mn could also allow the material properties to be optimized for use as stress sensors over a range of operational temperatures.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for making metal-substituted cobalt ferrite comprising the steps of:
    mixing oxides or carbonates of Fe, Co, and M in the targeted proportions to form a mixed powder, where M is selected from the group consisting of Mn, Cr, Zn, Al, Cu, and any mixtures thereof;
    pressing the mixed powder, calcining the mixed powder at a temperature in the range of approximately 900° C. to 1200° C. for a period of time ranging from about 2 to about 24 hours in air;
    ball milling the mixed powder to less than 38 micron powder;
    pressing and calcining the mixed powder at a temperature in the range of approximately 900° C. to 1200° C. for a period of time ranging from about 2 to about 24 hours in air;
    remilling the mixed powder to less than 38 micron powder;
    mixing the mixed powder and forming the mixed powder into a desired shape; and
    sintering the mixed powder at a temperature in the range of approximately 1000° C. to 1350° C. for a period of time ranging from about 2 to about 24 hours in air, thereby forming the metal-substituted cobalt ferrite.

2. The method of claim 1 wherein the metal being substituted into the compound is manganese.

3. The method of claim 2 wherein the manganese substituted cobalt ferrite has a general formula $CoFe_{2-x}Mn_xO_4$ where x is about 0 to about 1.0.

4. The method of claim 2 wherein the manganese substituted cobalt ferrite has a general formula $Co_{1-y}Mn_yFe_2O_4$ where y is about 0 to about 0.95.

5. The method of claim 2 wherein the manganese substituted cobalt ferrite has an amplitude of magnetostriction of at least about 50 to about 250 ppm.

6. A method for making transition metal-substituted cobalt ferrite comprising the steps of:
    mixing oxides or carbonates of Fe, Co, and M in the targeted proportions to form a mixed powder, where M is a transition metal (TM) and any mixtures thereof, wherein the TM is selected from the group consisting of chromium (Cr), zinc (Zn), and copper (Cu);
    pressing the mixed powder; calcining the mixed powder at a temperature in the range of approximately 900° C. to 1200° C. for a period of time ranging from about 2 to about 24 hours in air;
    ball milling the mixed powder to less than 38 micron powder;
    pressing and calcining the mixed powder at a temperature in the range of approximately 900° C. to 1200° C. for a period of time ranging from about 2 to about 24 hours in air;
    remilling the mixed powder to less than 38 micron powder;
    mixing the mixed powder and forming the mixed powder into a desired shape; and
    sintering the mixed powder at a temperature in the range of approximately 1000° C. to 1350° C. for a period of time ranging from about 2 to about 24 hours in air, thereby forming the transition metal-substituted cobalt ferrite.

7. The method of claim 6 wherein the transition metal-substituted cobalt ferrite has a general formula $CoFe_{2-x}TM_xO_4$ wherein TM is selected from the group consisting of Cr, Mn, Zn, Cu, and any mixtures thereof and x is about 0 to about 1.0.

8. The method of claim 6 wherein the transition metal-substituted cobalt ferrite has a general formula $Co_{1-y}TM_yFe_2O_4$ where TM is selected from the group consisting of Cr, Mn, Zn, Cu, and any mixtures thereof and y is about 0 to about 0.95.

9. A method for making metal-substituted cobalt ferrite comprising the steps of:
   mixing oxides or carbonates of Fe, Co, and M in the targeted proportions to form a mixed powder, where M is selected from the group consisting of Mn, Cr, Zn, Al, Cu, and any mixtures thereof;
   pressing the mixed powder; calcining the mixed powder at a temperature in the range of approximately 900° C. to 1200° C. for a period of time ranging from about 2 to about 24 hours in air;
   ball milling the mixed powder to less than 38 micron powder;
   pressing and calcining the mixed powder at a temperature in the range of approximately 900° C. to 1200° C. for a period of time ranging from about 2 to about 24 hours in air;
   adding a metallic binder to the mixed powder
   remilling the mixed powder to less than 38 micron powder;
   mixing the mixed powder and forming the mixed powder into a desired shape; and
   sintering the mixed powder at a temperature in the range of approximately 1000° C. to 1350° C. for a period of time ranging from about 2 to about 24 hours in air, thereby forming the metal-substituted cobalt ferrite.

10. The method of claim 9 wherein the step of adding a metallic binder includes the step of adding Ni powder and Ag powder wherein the Ag powder comprises a larger volume fraction of the metallic binder and the Ni powder comprise a least volume fraction of the metallic binder.

11. The method of claim 1 further comprising the step of adding an organic binder to the remilled mixed powder and wherein the sintering step occurs in air at approximately 1350° C. for 24 hours and cooling down the resulting sintered metal substituted cobalt ferrite either inside a furnace at a controlled cooling rate in the range of about 4° C. per hour to about 850° C. per hour or by removing the resulting sintered metal substituted cobalt ferrite from the furnace to room temperature air.

12. The method of claim 11 further comprising the step of heating the organically bound powder at about 500° C. for about 5 hours to allow the organic binder to burn out.

13. The method of claim 2 wherein the manganese-substituted cobalt ferrite has a reduction in Curie temperature of up to about 300 degree Celsius.

* * * * *